UNITED STATES PATENT OFFICE.

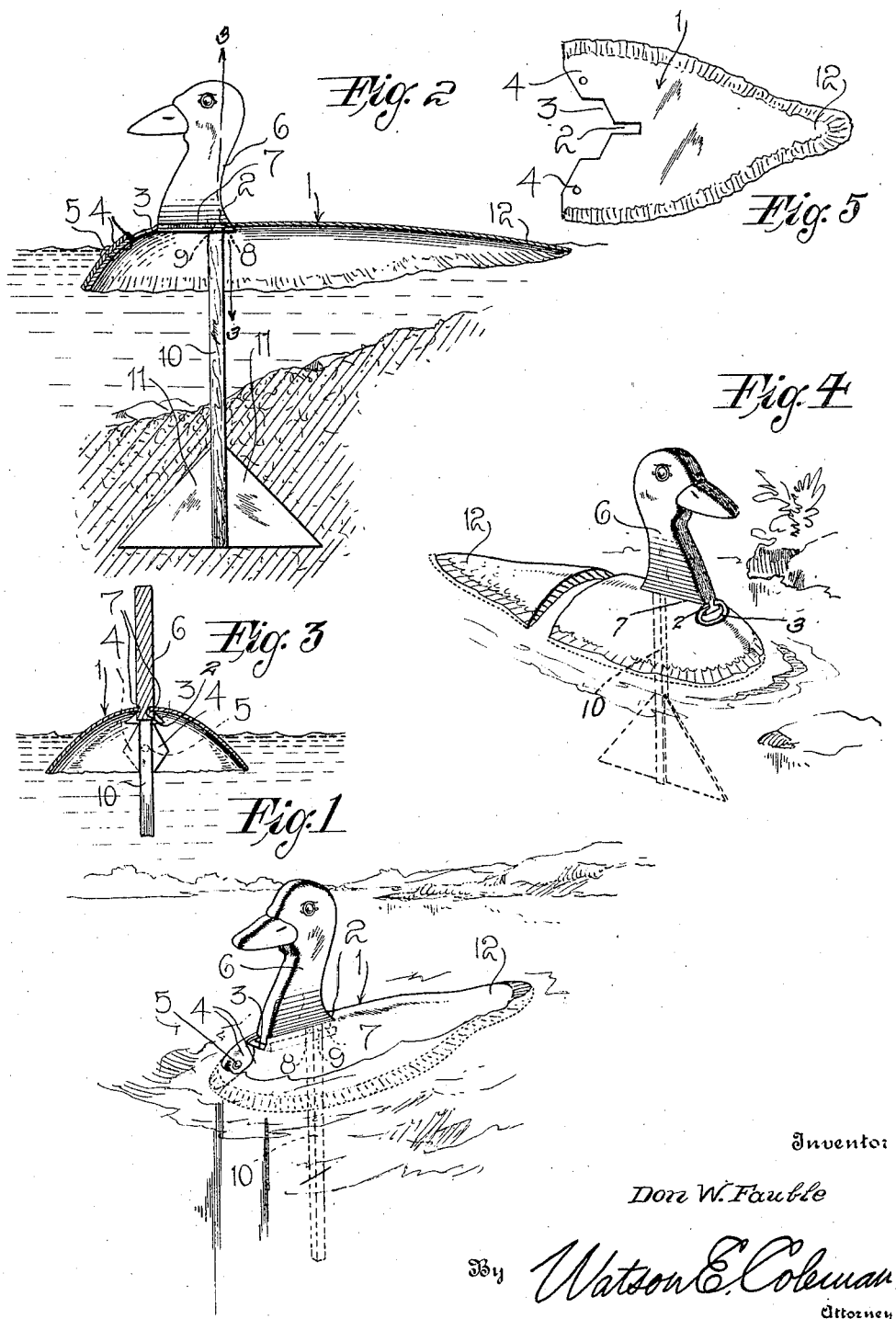
D. W. FAUBLE.
DECOY FOR WILD DUCKS AND THE LIKE.
APPLICATION FILED JULY 19, 1919.
1,316,566.
Patented Sept. 23, 1919.
Inventor
Don W. Fauble
By Watson E. Coleman
Attorney

DON W. FAUBLE, OF COLUMBUS, NEBRASKA, ASSIGNOR OF ONE-THIRD TO ERNEST M. PACE, OF COLUMBUS, NEBRASKA.

DECOY FOR WILD DUCKS AND THE LIKE.

1,316,566.     Specification of Letters Patent.     Patented Sept. 23, 1919.

Application filed July 19, 1919. Serial No. 311,936.

*To all whom it may concern:*

Be it known that I, DON W. FAUBLE, a citizen of the United States, residing at Columbus, in the county of Platte and State of Nebraska, have invented certain new and useful Improvements in Decoys for Wild Ducks and the like, of which the following is a specification, reference being had to the accompanying drawings.

This invention relates to an improved decoy for wild ducks and the like, and one of the objects of the invention is to provide a very simple, efficient and light and life-like decoy, and one which may be manufactured for a small cost and sold at a reasonable profit.

The invention further aims to provide a decoy, which is practically indestructible, and which may be easily and quickly assembled and disassembled, and when disassembled, may be arranged in a very small and compact compass, hence permitting the decoy to be easily and conveniently carried.

A further object of the invention is to provide an arch-shaped body, constructed of any suitable material, which may be disposed to appear as floating upon the surface of the water, in combination with a head, which may resemble the head of a duck, though not necessarily, for it is obvious that it can resemble the head of any other bird, having means detachably connecting the head to the body, so that the head and the body may be easily and quickly disconnected or disassembled, and the head disposed temporarily in the hollow of the body when not in use. It is obvious that the decoy may be disassembled and arranged compactly, for carrying and shipping purposes.

The invention further aims to provide a decoy body, which is hollow and is constructed of sheet metal, though not necessarily, and has an elongated slot at one end, the marginal edge portion of which is designed to engage the opposite grooves of the head of the decoy, to hold the head in position.

The invention further aims to provide an enlarged opening at one end of the body (which is curved downwardly and forwardly), whereby the opposite grooves of the head may engage the opposite edges of the slot, to hold the head rigidly in position, yet in such manner as to permit the head to be easily and quickly detached.

While the design and construction at present set forth and illustrated is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of the improved decoy constructed in accordance with the invention.

Fig. 2 is a longitudinal sectional view, showing the connections between the head and the body of the decoy, and also showing a modified means carried by the head and depending therefrom for balancing and keeping the decoy on an even keel, or in an upright position.

Fig. 3 is a cross-sectional view on line 3—3 of Fig. 2.

Fig. 4 is a respective view showing a pair of fins carried by the lower end of the depending member of the head, to insure holding the decoy on an even keel.

Fig. 5 is a detail view of the blank from which the body is formed.

Referring more especially to the drawings, 1 designates the body of the decoy, which is elongated and which may greatly resemble the body of a duck or other similar wild bird, and which is arch-shaped in cross-section. This body may be constructed of sheet metal, though not necessarily, for it may be constructed of any other suitable material. However, should the body be constructed of metal, it is first formed into a blank, such as shown in Fig. 5, and which is formed with an elongated slot 2 near one end, which opens and joins an enlarged opening or recess 3. Adjacent the recess or opening 3 the blank is provided with a pair of end pieces 4, which, when the blank is bent to form the body, overlap and are riveted together as shown at 5. By this construction, the blank is held firmly in the shape of the body of a wild duck or other bird. The front portion of the body when the blank is so shaped or formed inclines downwardly, so that the enlarged opening will assume a position in the downwardly inclined part of the body, and in this case one end of the slot is open. The head 6 of the decoy greatly resembles the head and neck of a wild duck, though not necessarily, and the lower part of the neck of the head of the decoy is provided with oppositely arranged grooves 7. The neck of the head of the decoy is somewhat thicker than the cross dimensions of the slot in the upper part of the body of the decoy, while the thickness of the neck of the head of the decoy at a point from one bottom to the other of said grooves, is a trifle smaller in cross dimensions, so that the opposite edges of the slot of the body of the decoy will easily enter the grooves at the lower part of the neck, hence maintaining the head of the decoy perpendicularly in position and rigidly connected to the body of the decoy. To connect the head to the body of the decoy, the lower part of the neck may be disposed adjacent the enlarged opening of the body of the decoy, so alining the lower part of the neck, so that the opposite edges of the slot will enter said grooves. The neck of the head of the decoy is provided with a bore 8, which is rectangular, and receives a correspondingly shaped end 9 of a depending member 10, which depending member is designed primarily for maintaining the decoy on an even keel. This depending member 10 extends down into the water and into the sand or mud, thereby acting to balance the decoy. In order to insure balancing the decoy on an even keel, the depending member as illustrated in Figs. 2 and 3, is provided with a pair of fins 11. The end of the blank opposite the slotted end is curved and shaped, in order to somewhat resemble the contour of the rear of a bird, and this end of the blank is also provided with an extension 12, which, when the blank is shaped as shown in Fig. 1, greatly resembles the tail of a wild duck or other bird.

This improved decoy may be easily and very quickly disassembled, by first removing the depending member from the lower portion of the neck of the head of the decoy, after which the neck of the head of the decoy may be moved forwardly of the body, whereby the groove may be disengaged from the opposite edges of the slot. The head of the decoy may then be disposed in the hollow of the body, together with the depending member, and then easily and very conveniently wrapped, for the purpose of carrying the decoy from one place to another.

In Fig. 4 the depending member 10 is also provided with fins, so that since the body of the decoy in Fig. 4 is constructed of thin wood (which floats), the fins acting to maintain the body on an even keel while floating. It is obvious that the body of the decoy may be made of sheet metal or of wood, without departing from the spirit of the invention.

The invention having been set forth, what is claimed as new and useful is:

1. In a decoy, the combination with a sheet metal body, being elongated and arch shaped in cross-section, the forward part of the body having a slot, the forward end of the body having an inclined portion, a head member for the decoy, said head member having oppositely arranged elongated grooves adapted to be engaged by the opposite edges of the slot when the head member is connected to the body, said forward inclined part of the body having an enlarged opening, to permit of the insertion of the lower part of the neck of the head member into the elongated slot.

2. In a decoy, the combination with a sheet metal body, being elongated and arch shaped in cross-section, the forward part of the body having a slot, the forward end of the body having an inclined portion, a head member for the decoy, said head member having oppositely arranged elongated grooves adapted to be engaged by the opposite edges of the slot when the head member is connected to the body, said forward inclined part of the body having an enlarged opening, to permit of the insertion of the lower part of the neck of the head member into the elongated slot, and means depending from the lower part of the neck of the head member and down into the water to balance the decoy on an even keel.

3. In a decoy, the combination with an elongated body hollowed out from its under portion and being arch-shaped in cross-section, the forward part of the upper part of the body having a slot, the forward part of the body near the slot having a downwardly positioned portion, of a head member for the decoy and having grooved connections with said slot when the head member is connected to the body, said downwardly extending part of the body being cut away, to permit of the insertion of the lower end of the head member to have grooved connections with said slot.

4. In a decoy, the combination with a body hollowed out from the under surface, said body being constructed of sheet metal being shaped upon itself to form the body arch-shaped, the forward end of the body having a downwardly extending part, of a head member for the decoy, the lower edge portion of the head member having slot and grooved connections with the upper part of the body forwardly thereof and immediately adjacent the downwardly extending part, the upper portion of the downwardly extending part having an opening, to permit of the groove and slot connections between the head member and the body, said sheet metal of the body at the forward end of the body having overlapped secured ends, whereby the body may be shaped as aforesaid.

In testimony whereof I hereunto affix my signature.

DON W. FAUBLE.

Copies of this patent may be obtained for five cents each, by addressing the "Commissioner of Patents, Washington, D. C."